United States Patent
Yanagi et al.

(10) Patent No.: US 8,105,650 B2
(45) Date of Patent: Jan. 31, 2012

(54) INK SET FOR INKJET RECORDING AND IMAGE RECORDING METHOD

(75) Inventors: Terukazu Yanagi, Ashigarakami-gun (JP); Takahiro Ishizuka, Ashigarakami-gun (JP); Akio Tamura, Ashigarakami-gun (JP); Takahiro Kato, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 419 days.

(21) Appl. No.: 12/367,979

(22) Filed: Feb. 9, 2009

(65) Prior Publication Data

US 2009/0202722 A1 Aug. 13, 2009

(30) Foreign Application Priority Data

Feb. 13, 2008 (JP) ................................. 2008-032170

(51) Int. Cl.
*B05D 1/36* (2006.01)
*B05D 5/00* (2006.01)

(52) U.S. Cl. ........ 427/265; 427/258; 427/256; 524/502; 524/599

(58) Field of Classification Search .................. 427/265, 427/258, 256; 524/599, 502
See application file for complete search history.

(56) References Cited

U.S. PATENT DOCUMENTS

| 6,426,375 B1 * | 7/2002 | Kubota ........................... 523/160 |
| 6,439,708 B1 * | 8/2002 | Kato et al. ....................... 347/98 |
| 6,538,047 B1 * | 3/2003 | Miyabayashi ................ 523/160 |

FOREIGN PATENT DOCUMENTS

| EP | 1 022 151 A1 | 7/2000 |
| EP | 1 041 126 A2 | 10/2000 |
| EP | 1 088 865 A1 | 4/2001 |
| JP | 9-207424 A | 8/1997 |
| JP | 3069543 B2 | 7/1998 |
| JP | 2000-063719 A | 2/2000 |
| JP | 2000063719 A * | 2/2000 |

OTHER PUBLICATIONS

EP Communication, dated May 27, 2009, issued in corresponding EP Application No. 09152444.7, 6 pages.

* cited by examiner

*Primary Examiner* — Timothy J. Kugel
(74) *Attorney, Agent, or Firm* — Sughrue Mion, PLLC

(57) ABSTRACT

An ink set for inkjet recording is provided. The ink set includes: at least one kind of ink composition that contains self-dispersing polymer particles, a color material, a hydrophilic organic solvent and water; and a reaction liquid capable of forming an aggregate upon contact with the ink composition.

8 Claims, No Drawings

INK SET FOR INKJET RECORDING AND IMAGE RECORDING METHOD

CROSS-REFERENCE TO RELATED APPLICATION

This Application claims priority under 35 USC 119 from Japanese Patent Application No. 2008-032170, the disclosure of which is incorporated by reference herein.

BACKGROUND OF THE INVENTION

1. Technical Field

The present invention relates to an ink set for inkjet recording and an image recording method.

2. Description of the Related Art

An inkjet-recording method performs recording by respectively ejecting ink droplets from many nozzles formed on an inkjet head, and is widely used for the reasons that noise at the time of a recording operation is low, running costs are inexpensive and a high definition image can be recorded on a large variety of recording media.

As an inkjet recording method, a two-liquid reaction method in which an ink and a processing liquid that aggregates the ink are reacted to aggregate the ink, thereby promoting fixation of the ink, is known.

As an inkjet recording method that is able to suppress, for instance, bleeding of printed characters and printing irregularities, an inkjet recording method in which a reaction liquid containing a polyvalent metal salt and an ink composition containing a pigment and a resin emulsion are adhered to a recording medium is known (see, for example, Japanese Patent Application Laid-open (JP-A) No. 09-207424).

Furthermore, as an inkjet ink composition having excellent waterproofness and stain resistance, an inkjet ink composition containing an ink composition containing self-dispersing polymer particles is known (see, for example, Japanese Patent No. 3069543).

SUMMARY OF THE INVENTION

However, the inkjet recording method that uses a reaction liquid and an ink composition described in JP-A No. 09-207424 has insufficient ink aggregation speed; accordingly, it has been difficult to apply this method to a faster speed inkjet recording method. Furthermore, although the inkjet ink composition described in Japanese Patent No. 3069543 has improved ink fixability, it has been difficult to apply it to a faster speed inkjet recording method.

The invention has been made in view of the above-mentioned situations and provides an ink set for inkjet recording and an image recording method therewith.

According to a first aspect of the present invention, an ink set for inkjet recording is provided. The ink set for inkjet recording of the first aspect of the present invention includes: at least one ink composition that contains self-dispersing polymer particles, a color material and water; and a reaction liquid capable of forming an aggregate upon contact with the ink composition.

According to a second aspect of the present invention, an image recording method is provided. The image recording method of the second aspect of the present invention includes forming an image using the ink set for inkjet recording of the first aspect of the present invention.

DETAILED DESCRIPTION OF THE INVENTION

<Ink Set for Inkjet Recording>

An ink set for inkjet recording of the invention contains at least one ink composition that contains self-dispersing polymer particles, a color material and water; and a reaction liquid capable of forming an aggregate upon contact with the ink composition. When the ink composition contains self-dispersing polymer particles, it is possible to improve a speed of forming aggregates due to contact of the ink composition and reaction liquid.

The ink set of the invention is used in an inkjet recording method and may be used as well in general writing tools, recorders and pen plotters.

[Ink Composition]

An ink composition in the invention contains at least one kind of self-dispersing polymer particles, at least one kind of color material and water. The ink composition of the invention may be used for forming not only a monochromatic image but also a full-color image. When a full-color image is formed, a magenta color ink, a cyan color ink and a yellow color ink may be used and a black color ink may be further used to adjust a color tone. Still furthermore, red, green, blue and white inks and so-called special inks (such as colorless) in a printing field may be used other than the yellow, magenta and cyan tone inks.

Self-Dispersing Polymer Particles

The ink composition of the invention contains at least one kind of self-dispersing polymer particles. The self-dispersing polymer particles in the invention are particles of a water-insoluble polymer that may form a dispersion state in an aqueous medium under the absence of another surfactant, due to functional groups (in particular, for example, an acidic group or salt thereof) that the polymer itself has. The particles of water-insoluble polymer do not contain a free emulsifier.

Herein, the dispersion state includes both of an emulsified state (emulsion) where a water-insoluble polymer is dispersed in a liquid state in an aqueous medium and a dispersed state (suspension) where a water-insoluble polymer is dispersed in a solid state in an aqueous medium.

In the water-insoluble polymer in the invention, a water-insoluble polymer that may be dispersed in a solid state to form a dispersed state is preferred from the viewpoint of ink aggregation speed and ink fixability when the water-insoluble polymer is contained in an ink composition.

The dispersed state of self-dispersing polymer particles in the invention means a state where a solution in which 30 g of an water-insoluble polymer is dissolved in 70 g of an organic solvent (for example, methyl ethyl ketone), a neutralizing agent (sodium hydroxide when a salt generating group is anionic; and acetic acid when salt generating group is cationic) capable of neutralizing 100% of salt generating groups of the water-insoluble polymer, and 200 g of water are mixed and agitated (device used for agitating: an agitator with an agitating blade, number of rotation: 200 rpm, 30 minutes, 25° C.), followed by removing the organic solvent from the mixed solution, thereafter, a dispersed state stably existing for at least one week at 25° C. can be visually confirmed.

Furthermore, a water-insoluble polymer is a polymer of which amount of dissolution when the polymer is dried at 105° C. for 2 hours and dissolved in 100 g of water at 25° C. is 10 g or less. The amount of dissolution is preferably 5 g or less and more preferably 1 g or less. The amount of dissolution is an amount of dissolution when 100% of salt generating groups of the water-insoluble polymer are neutralized with sodium hydroxide or acetic acid depending on the kind of the salt generating groups of the water-insoluble polymer.

The aqueous medium contains water and may contain a hydrophilic organic solvent as required. In the invention, the aqueous medium is preferably constituted of water and 0.2% by mass or less of a hydrophilic organic solvent relative to water and more preferably constituted of water.

A main chain skeleton of the water-insoluble polymer is not restricted to particular one and examples thereof include vinyl polymers and condensed polymers (for example, epoxy resin, polyester, polyurethane, polyamide, cellulose, polyether, polyurea, polyimide, polycarbonate, and the like). Among these, vinyl polymers are particularly preferred.

Preferable examples of the vinyl polymer and a monomer used for the vinyl polymer include those described in JP-A Nos. 2001-181549 and 2002-88294. A vinyl polymer in which a dissociative group is introduced at a terminal of a polymer chain by a radical polymerization of vinyl monomers, which uses a chain transfer agent having a dissociative group (or substituent derivable to a dissociative group), a polymerization initiator or an iniferter or by an ionic polymerization that uses a compound having a dissociative group (or substituent derivable to dissociative group) in either one of an initiator or a terminator may be used as well.

Preferable examples of the condensed polymer and a monomer used for the condensed polymer include those described in JP-A No. 2001-247787.

Self-dispersing polymer fine particles of the invention preferably contain a water-insoluble polymer containing a hydrophilic constituent unit and a constituent unit derived from an aromatic group-containing monomer from the viewpoint of the self-dispersibility.

The hydrophilic constituent unit may be one derived from one kind of hydrophilic group-containing monomer or one derived from two or more kind of hydrophilic group-containing monomers without particular restriction as far as it is derived from one or more hydrophilic group-containing monomers. The hydrophilic group may be a dissociative group or a nonionic hydrophilic group without particular restriction.

In the invention, the hydrophilic group is preferably a dissociative group and more preferably an anionic dissociative group from the viewpoint of promoting the self-dispersibility and stability of a formed emulsion or dispersion state. Examples of the dissociative group include a carboxyl group, a phosphoric acid group and a sulfonic acid group. Among these, a carboxyl group is preferred from the viewpoint of the fixing property of an ink composition, when an ink composition is formed using the self-dispersing polymer particles.

The hydrophilic group-containing monomer in the invention is preferably a dissociative group-containing monomer and more preferably a dissociative group-containing monomer having a dissociative group and an ethylenically unsaturated bond from the viewpoint of the self-dispersibility and aggregation property.

Examples of dissociative group-containing monomer include unsaturated carboxylic acid monomer, unsaturated sulfonic acid monomer and unsaturated phosphoric acid monomer.

Specific examples of unsaturated carboxylic acid monomer include acrylic acid, methacrylic acid, crotonic acid, itaconic acid, maleic acid, fumaric acid, citraconic acid and 2-methacryloyloxymethyl succinic acid. Specific examples of unsaturated sulfonic acid monomer include styrene sulfonic acid, 2-acrylamide-2-methylpropane sulfonic acid, 3-sulfopropyl(meth)acrylate and bis-(3-sulfopropyl)-itaconic acid ester. Specific examples of unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among the dissociative group-containing monomers, unsaturated carboxylic acid monomers are preferred and acrylic acid and methacrylic acid are more preferred from the viewpoint of the dispersion stability and ejection stability.

The self-dispersing polymer particles of the invention preferably contain a first polymer that has a carboxyl group and an acid value (mgKOH/g) of from 25 to 100 from the viewpoint of the self-dispersibility and aggregation speed at the time of contact with a reaction liquid. Furthermore, the acid value is more preferably from 25 to 80 and particularly preferably from 30 to 65 from the viewpoint of the self-dispersibility and aggregation speed at the time of contact with a reaction liquid.

When the acid value is 25 or more, the stability of the self-dispersibility becomes more favorable. Furthermore, when the acid value is 100 or less, the aggregation property is improved.

The aromatic group-containing monomer is not particularly restricted as far as it is a compound that contains an aromatic group and a polymerizable group. The aromatic group may be a group derived from an aromatic hydrocarbon or a group derived from an aromatic heterocyclic group. In the invention, an aromatic group derived from an aromatic hydrocarbon is preferred from the viewpoint of the particle shape stability in an aqueous medium.

The polymerizable group may be a condensation polymerizable group or an addition polymerizable group. In the invention, the addition polymerizable group is preferred and a group containing an ethylenically unsaturated bond is more preferred from the viewpoint of the particle shape stability in an aqueous medium.

The aromatic group-containing monomer in the invention is preferably a monomer having an aromatic group derived from an aromatic hydrocarbon and an ethylenically unsaturated bond and more preferably an aromatic group-containing (meth)acrylate monomer.

In the invention, the aromatic group-containing monomers may be used singularly or in a combination of at least two kinds thereof.

Examples of the aromatic group-containing monomer include phenoxyethyl(meth)acrylate, benzyl(meth)acrylate, phenyl(meth)acrylate and a styrene-based monomer. Among these, the aromatic group-containing monomer is preferably at least one kind selected from phenoxyethyl(meth)acrylate, benzyl(meth)acrylate and phenyl(meth)acrylate, more preferably phenoxyethyl(meth)acrylate, and particularly preferably phenoxyethyl acrylate, from the viewpoint of balance between the hydrophilicity and hydrophobicity of a polymer chain and ink fixability.

Herein, the "(meth)acrylate" means acrylate or methacrylate.

Self-dispersing polymer fine particles in the invention preferably contain a constituent unit derived from an aromatic group-containing (meth)acrylate monomer and the content of the constituent unit derived from the aromatic group-containing meth(acrylate) monomer is preferably from 10 to 95% by mass. When the content of the aromatic group-containing (meth)acrylate monomer is from 10 to 95% by mass, the stability of self-emulsification or dispersion state may be improved and the ink viscosity may be inhibited from increasing.

In the invention, the content is more preferably from 15 to 90% by mass, still more preferably from 15 to 80% by mass and particularly preferably from 25 to 70% by mass from the viewpoints of the stability of a self-dispersing state, stabilization of particle shape in an aqueous medium due to a hydrophobic interaction between aromatic rings and lowering of an amount of aqueous component due to appropriate hydrophobization of particles.

Self-dispersing polymer fine particles of the invention may include, for instance, a constituent unit formed from an aromatic group-containing monomer and a constituent unit formed from a dissociative group-containing monomer. The self-dispersing polymer particles may further contain additional constituent unit as required.

The monomer forming the additional constituent unit is not restricted to particular one as far as it is a monomer copolymerizable with the aromatic group-containing monomer and the dissociative group-containing monomer. Among those, an alkyl group-containing monomer is preferred from the viewpoint of the flexibility of a polymer skeleton and easiness of control of the glass transition temperature (Tg).

Examples of the alkyl group-containing monomer include alkyl(meth)acrylate such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate or ethylhexyl (meth)acrylate; ethylenically unsaturated monomer with a hydroxyl group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate or hydroxyhexyl(meth)acrylate; dialkylaminoalkyl (meth)acrylate such as dimethylaminoethyl(meth)acrylate; N-hydroxyalkyl(meth)acrylamide such as N-hydroxymethyl (meth)acrylamide, N-hydroxyethyl(meth)acrylamide or N-hydroxybutyl(meth)acrylamide; and (meth)acrylamide such as N-methoxymethyl(meth)acrylamide, N-ethoxymethyl(meth)acrylamide, N-(n-, iso)butoxymethyl(meth)acrylamide, N-methoxyethyl(meth)acrylamide, N-ethoxyethyl (meth)acrylamide or N-(n-, iso)butoxyethyl(meth) acrylamide.

A range of a molecular weight of the water-insoluble polymer that is used for forming self-dispersing polymer particles in the invention is, by weight average molecular weight, preferably from 3,000 to 200,000, more preferably from 5,000 to 150,000 and particularly preferably from 10,000 to 100,000. When the weight average molecular weight is set 3,000 or more, an amount of water-soluble component is effectively suppressed. Furthermore, when the weight average molecular weight is set 200,000 or less, the self-dispersion stability may be heightened.

The weight average molecular weight can be measured by gel permeation chromatograph (GPC).

The water-insoluble polymer that is used for forming self-dispersing polymer particles in the invention preferably contains an aromatic group-containing (meth)acrylate monomer-derived component from 15 to 90% by mass as a copolymerization ratio, a carboxyl group-containing monomer-derived component and an alkyl group-containing monomer-derived component, and preferably has the acid value of from 25 to 100 and a weight average molecular weight of from 3,000 to 200,000 from the viewpoint of hydrophilicity and hydrophobicity control of the polymer. The water-insoluble polymer that is used for forming self-dispersing polymer particles more preferably contains an aromatic group-containing (meth)acrylate monomer-derived component from 15 to 80% by mass as a copolymerization ratio, a carboxyl group-containing monomer-derived component and an alkyl group-containing monomer-derived component, and more preferably has the acid value of from 25 to 95 and a weight average molecular weight of from 5,000 to 150,000 from the viewpoint of hydrophilicity and hydrophobicity control of the polymer.

In what follows, as specific examples of the water-insoluble polymer that is used for forming self-dispersing polymer particles, exemplary compounds B-01 through B-19 are cited without particularly restricting thereto. In a bracket, a mass ratio of copolymerizing components is shown.

B-01: phenoxyethyl acrylate/methyl methacrylate/acrylic acid copolymer (50/45/5),
B-02: phenoxyethyl acrylate/benzyl methacrylate/isobutyl methacrylate/methacrylic acid copolymer (30/35/29/6),
B-03: phenoxyethyl methacrylate/isobutyl methacrylate/ methacrylic acid copolymer (50/44/6),
B-04: phenoxyethyl acrylate/methyl methacrylate/ethyl acrylate/acrylic acid copolymer (30/55/10/5),
B-05: benzyl methacrylate/isobutyl methacrylate/methacrylic acid copolymer (35/59/6),
B-06: styrene/phenoxyethyl acrylate/methyl methacrylate/ acrylic acid copolymer (10/50/35/5),
B-07: benzyl acrylate/methyl methacrylate/acrylic acid copolymer (55/40/5),
B-08: phenoxyethyl methacrylate/benzyl acrylate/methacrylic acid copolymer (45/47/8),
B-09: styrene/phenoxyethyl acrylate/butyl methacrylate/ acrylic acid copolymer (5/48/40/7),
B-10: benzyl methacrylate/isobutyl methacrylate/cyclohexyl methacrylate/methacrylic acid copolymer (35/30/30/5),
B-11: phenoxyethyl acrylate/methyl methacrylate/butyl acrylate/methacrylic acid copolymer (12/50/30/8),
B-12: benzyl acrylate/isobutyl methacrylate/acrylic acid copolymer (93/2/5),
B-13: styrene/phenoxyethyl methacrylate/butyl acrylate/ acrylic acid copolymer (50/5/20/25),
B-14: styrene/butyl acrylate/acrylic acid copolymer (62/35/ 3),
B-15: methyl methacrylate/phenoxyethyl acrylate/acrylic acid copolymer (45/51/4),
B-16: methyl methacrylate/phenoxyethyl acrylate/acrylic acid copolymer (45/49/6),
B-17: methyl methacrylate/phenoxyethyl acrylate/acrylic acid copolymer (45/48/7),
B-18: methyl methacrylate/phenoxyethyl acrylate/acrylic acid copolymer (45/47/8),
B-19: methyl methacrylate/phenoxyethyl acrylate/acrylic acid copolymer (45/45/10)

A producing method of an water-insoluble polymer that is used for forming self-dispersing polymer particles in the invention is not restricted to particular one. Examples of the producing method of an water-insoluble polymer include a method where emulsion polymerization is performed under the presence of a polymerizable surfactant so as to covalently bond the surfactant and the water-insoluble polymer, and a method where a monomer mixture containing the hydrophilic group-containing monomer and aromatic group-containing monomer is copolymerized according to a known polymerization method such as a solution polymerization method or a block polymerization method. Among the polymerization methods, a solution polymerization method is preferred and a solution polymerization method that uses an organic solvent is more preferred from the viewpoints of the aggregation speed and the droplet ejection stability of an ink composition formed using the self-dispersing polymer particles.

It is preferable, from the viewpoint of the aggregation speed, that the self-dispersing polymer particles in the invention contain a first polymer synthesized in an organic solvent, the first polymer has at least one carboxyl group and has an acid value of from 25 to 100, the at least one carboxyl group of the first polymer is neutralized at least partially, and the self-dispersing polymer particles are prepared as particles dispersed in a polymer dispersion that contains water as a continuous phase.

That is, a producing method of self-dispersing polymer particles in the invention includes a step of synthesizing the first polymer in an organic solvent; and a step of dispersing in which carboxyl groups of the first polymer are at least partially neutralized to form an aqueous dispersion.

The step of dispersing preferably includes steps (1) and (2) shown below.

Step (1): A step of agitating a mixture containing a first polymer (water-insoluble polymer), an organic solvent, a neutralizing agent and an aqueous medium.

Step (2): A step of removing the organic solvent from the mixture.

The step (1) is preferred to be a treatment where at first the first polymer (water-insoluble polymer) is dissolved in an organic solvent, then a neutralizing agent and an aqueous medium are gradually added thereto, followed by mixing and agitating to obtain a dispersion. When the neutralizing agent and aqueous medium are added into a solution of a water-insoluble polymer dissolved in the organic solvent, it is possible to obtain self-dispersing polymer particles having a particle size with which higher storage stability can be provided, without necessitating strong shearing force.

An agitating method of the mixture is not restricted to particular one. A mixing agitator generally used is used, or a disperser such as an ultrasonic disperser or a high pressure homogenizer may be used as required.

Preferable examples of the organic solvent include alcohol-based solvents, ketone-based solvents and ether-based solvents.

Examples of the alcohol-based solvent include isopropyl alcohol, n-butanol, t-butanol and ethanol. Examples of the ketone-based solvent include acetone, methyl ethyl ketone, diethyl ketone and methyl isobutyl ketone. Examples of the ether-based solvent include dibutyl ether and dioxane. Among the solvents, ketone-based solvent such as methyl ethyl ketone and alcohol-based solvent such as isopropyl alcohol are preferred. Furthermore, isopropyl alcohol and methyl ethyl ketone are preferably used together for the purpose of moderating polarity change at the time of phase conversion from an oil phase to an aqueous phase. When the solvents are used together, it is possible to obtain self-dispersing polymer particles, which do not cause aggregation/precipitation and fusion between particles and have a small particle size with which high dispersion stability can be provided.

The neutralizing agent is used to partially or entirely neutralize the dissociative groups to form an emulsifying or dispersing state where the self-dispersing polymer is stabilized in water. When the self-dispersing polymer of the invention has anionic dissociative groups (such as carboxyl groups) as the dissociative group, examples of the neutralizing agents that are used include organic amine compounds, ammonia and basic compounds such as hydroxide of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-prop anol, 2-amino-2-methyl-1-propanol, N-methyldiethanolamine, N-ethyldiethanolamine, monoisopropanolamine, diisopropanolamine and triisopropanolamine. Examples of hydroxide of alkali metal include lithium hydroxide, sodium hydroxide and potassium hydroxide. Among these, sodium hydroxide, potassium hydroxide, triethylamine and triethanolamine are preferred from the viewpoint of the dispersion stability of the self-dispersing polymer particles of the invention into water.

The basic compound may be used, relative to 100% by mol of the dissociative groups, preferably from 5 to 120% by mol, more preferably from 10 to 110% by mol and still more preferably from 15 to 100% by mol. When the basic compound is used 15% or more, an effect of stably dispersing particles in water can be developed and, when it is 100% or less, an effect of lowering the water-soluble component can be developed.

In the step (2), by distilling away the organic solvent from the dispersion obtained in the step (1) by use of a standard method such as reduced pressure distillation to convert to an aqueous phase, an aqueous dispersion of the self-dispersing polymer particles can be obtained. The organic solvent in the resulted aqueous dispersion is substantially removed and an amount of the organic solvent is preferably 0.2% by mass or less and more preferably 0.1% by mass or less.

An average particle size of the self-dispersing polymer particles in the invention is preferably in the range of from 10 to 400 nm, more preferably from 10 to 200 nm and still more preferably from 10 to 100 nm. When the average particle size is 10 nm or more, the production aptitude may be improved. When it is 400 nm or less, the storage stability may be improved.

A particle size distribution of the self-dispersing polymer particles may be any one of one that has a wide particle size distribution or one that has a mono-disperse particle size distribution without particular restriction. Furthermore, two or more kinds of the water-insoluble particles may be mixed and used.

An average particle size and particle size distribution of the self-dispersing polymer particles may be measured by use of, for instance, an optical scattering method.

The self-dispersing polymer particles of the invention may be preferably contained in, for instance, an aqueous ink composition and may be used singularly or in a combination of at least two kinds thereof.

Color Material

The ink composition of the present invention contains at least one kind of color material. As the color material, any one of conventional dyes, pigments and the like may be used without particular limitation. Above all, a color material that is substantially insoluble or sparingly soluble in water is preferred from the standpoint of ink coloring properties. Specific examples of the color material include various pigments, disperse dyes, oil-soluble dyes and dyestuffs forming J aggregate. Pigments are more preferred.

In the invention, the water-insoluble pigment itself or the pigment itself surface-treated with a dispersant can be used as the color material.

The pigment that may be used in the invention is not particularly limited in its kind, and any one of the conventional organic and inorganic pigments may be used. Examples of the pigment that may be used include polycyclic pigments such as azo lake, azo pigment, phthalocyanine pigment, perylene and perynone pigments, anthraquinone pigment, quinacridone pigment, dioxadine pigment, diketopyrrolopyrrole pigment, thioindigo pigment, isoindoline pigment and quinophthalone pigment; dye lakes such as basic dye type lake and acidic dye type lake; organic pigments such as nitro pigment, nitroso pigment, aniline black and daylight fluorescent pigment; and inorganic pigments such as titanium oxide, iron oxide type and carbon black type. Even pigments that are not described in Color Index can be used so long as it is a pigment capable of being dispersed in an aqueous phase. Furthermore, those obtained by surface treating the above-described pigments with a surfactant, a polymeric dispersant or the like, and grafted carbon can also be used. Of the above pigments, azo pigment, phthalocyanine pigment, anthraquinone pigment, quinacridone pigment and carbon black type pigment are preferably used.

Specific examples of the organic pigment used in the invention are described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

Dispersant

When the color material used in the invention is a pigment, the pigment is preferably dispersed in an aqueous solvent by a dispersant. The dispersant may be a polymer dispersant, or a low molecular surfactant type dispersant. The polymer dispersant may be either one of a water-soluble dispersant or a water-insoluble dispersant.

The low molecular surfactant type dispersant (hereinafter sometimes referred to as a "low molecular-weight dispersant") can be added for the purpose of stably dispersing the organic pigment in a water solvent while maintaining an ink in low viscosity. The low molecular-weight dispersant used herein means a low molecular-weight dispersant having a molecular weigh of 2,000 or lower. The molecular weight of the low molecular-weight dispersant is preferably from 100 to 2,000, and more preferably from 200 to 2,000.

The low molecular-weight dispersant has a structure containing a hydrophilic group and a hydrophobic group. At least one of each of the hydrophilic group and the hydrophobic group may be independently contained in one molecule, and the low molecular-weight dispersant may have plural kinds of the hydrophilic group and the hydrophobic group. The low molecular-weight dispersant can appropriately have a linking group for linking the hydrophilic group and the hydrophobic group.

Examples of the hydrophilic group include an anionic group, a cationic group, a nonionic group, and a betaine type combining those.

The anionic group is not particularly limited so long as it has a negative charge. A phosphoric acid group, a phosphonic acid group, a phosphinic acid group, a sulfuric acid group, a sulfonic acid group, a sulfinic acid group and a carboxyl group are preferred, a phosphoric acid group and carboxyl group are more preferred, and a carboxyl group is further preferred.

The cationic group is not particularly limited so long as it has a positive charge. An organic cationic substituent is preferred, a cationic group containing nitrogen or phosphorus is more preferred, and a cationic group having nitrogen is further preferred. Above all, pyridinium cation and ammonium cation are particularly preferred.

The nonionic group is not particularly limited so long as it does not have negative or positive charge. Examples of the nonionic group include polyalkylene oxide, polyglycerin and a part of sugar unit It is preferred in the invention that the hydrophilic group is an anionic group from the standpoints of dispersion stability and aggregation properties of a pigment.

When the low molecular-weight dispersant has an anionic hydrophilic group, its pKa is preferably 3 or more from the standpoint of contacting with an acidic treating liquid to accelerate an aggregation reaction. The pKa of the low molecular-weight dispersant in the invention is a value experimentally obtained from a titration curve by titrating a liquid obtained dissolving 1 mmol/liter of a low molecular-weight dispersant in a tetrahydrofuran-water=3:2 (V/V) solution, with an acid or alkali aqueous solution.

Theoretically, when pKa of a low molecular weight dispersant is 3 or more, 50% or more of anionic groups are in a non-dissociation state when contacted with a treating liquid having a pH of about 3. Therefore, water solubility of the low molecular weight dispersant is remarkably decreased, and an aggregation reaction occurs. In other words, aggregation reactivity is improved. From this standpoint, it is preferred that the low molecular-weight dispersant has a carboxylic group as an anionic group.

On the other hand, the hydrophobic group may have any structure of hydrocarbon type, fluorocarbon type, silicone type and the like, and the hydrocarbon type is particularly preferred. Those hydrophobic groups may have any of a linear structure and a branched structure. The hydrophobic group may have one chain structure or two or more chain structure. Where the structure has two or more chains, the structure may have plural kinds of hydrophobic groups.

The hydrophobic group is preferably a hydrocarbon group having from 2 to 24 carbon atoms, more preferably a hydrocarbon group having from 4 to 24 carbon atoms, and further preferably a hydrocarbon group having from 6 to 20 carbon atoms.

Of the polymer dispersants in the invention, a hydrophilic polymer compound can be used as the water-soluble dispersant. Examples of a natural hydrophilic polymer compound include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer compound using a natural product as a raw material include cellulose polymers such as methyl cellulose, ethyl cellulose, hydroxyethyl cellulose, hydroxypropyl cellulose and carboxymethyl cellulose; starch polymers such as starch sodium glycolate and starch sodium phosphate ester; and seaweed polymers such as propylene glycol alginate ester.

Examples of a synthetic water-soluble polymer compound include vinyl polymers such as polyvinyl alcohol, polyvinyl pyrrolidone and polyvinyl methyl ether; acrylic resins such as polyacrylamide, polyacrylic acid or its alkali metal salt, and water-soluble styrene acrylic resin; water-soluble styrene maleic acid resins; water-soluble vinylnaphthalene acrylic resins; water-soluble vinylnaphthalene maleic resins; polyvinyl pyrrolidone, polyvinyl alcohol, alkali metal salts of β-naphthalenesulfonic acid formalin condensate; and polymer compounds having a salt of a cationic functional group such as quaternary ammonium or amino group at a side chain.

Of those, a polymer compound containing a carboxyl group is preferred from the standpoints of dispersion stability and aggregation properties of pigment. Polymer compounds containing a carboxyl group, such as acrylic resins such as water-soluble styrene acrylic resin; water-soluble styrene maleic resin; water-soluble vinylnaphthalene acrylic resin; and water-soluble vinylnaphthalene maleic acid resin are particularly preferred.

Of the polymer dispersants, as a non-water-soluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol(meth)acrylate-(meth)acrylic acid copolymer and styrene-maleic acid copolymer.

The polymer dispersant used in the invention has a weight average molecular weight of preferably from 3,000 to 200,000, more preferably from 5,000 to 100,000, further preferably from 5,000 to 80,000, and particularly preferably from 10,000 to 60,000.

The weight average molecular weight can be measured with gel permeation chromatograph (GPC).

Mixing mass ratio of a pigment and a dispersant (pigment:dispersant) is preferably in a range of from 1:0.06 to 1:3, more preferably in a range of from 1:0.125 to 1:2, and further preferably in a range of from 1:0.125 to 1:1.5.

When a dye is used as the color material in the invention, a material in which a water-insoluble carrier supporting a dye can be used as water-insoluble colored particles. As the dye, conventional dyes may be used without particular limitation. For example, dyes described in JP-A No. 2001-115066, JP-A No. 2001-335714 and JP-A No. 2002-249677 can preferably be used in the invention. The carrier used is not particularly limited so long as it is insoluble or sparingly soluble in water, and inorganic materials, organic materials and their composite materials can be used. Specifically, carriers described in, for example, JP-A No. 2001-181549 and JP-A No. 2007-169418 can preferably be used in the invention.

The carrier supporting a dye (water-insoluble colored particles) can be used as an aqueous dispersion using a dispersant. As the dispersant, any of the dispersants described hereinabove can be preferably used.

From the standpoints of light resistance and quality of an image, the color material used in the invention preferably contain a pigment and a dispersant, more preferably contain an organic pigment and a polymer dispersant, and particularly preferably contain an organic pigment and a polymer dispersant containing a carboxylic group.

In view of the aggregation property, the color material used in the invention is preferably a color material that is coated with a polymer dispersant (second polymer) having a carboxyl group and is water-insoluble.

Further, in view of the aggregation property, the acid value of the self-dispersible polymer particles is preferably lower than the acid value of the polymer dispersant.

The color material used in the invention may have an average particle size of preferably from 10 to 200 nm, more preferably from 10 to 150 nm, and further preferably from 10 to 100 nm. When the average particle size is 200 nm or less, color reproducibility becomes better, and in the case of an inkjet method, droplet ejection properties become better. Furthermore, when the average particle size is 10 nm or more, light resistance becomes better.

Particle size distribution of the color material is not particularly limited, and may be any of wide particle size distribution and monodisperse particle size distribution. A mixture of two kinds or more of water-insoluble colored particles having monodisperse particle size distribution may be used.

The average particle size and the particle size distribution of the water-insoluble colored particles can be measured using, for example, a light scattering method.

In the invention, the color material may be used in a single kind or as mixtures of two or more kinds thereof.

From the standpoint of image density, the content of the color material is preferably from 1 to 25% by mass, more preferably from 2 to 20% by mass, further preferably from 5 to 20% by mass, and particularly preferably from 5 to 15% by mass, based on the mass of the ink composition.

The content of the self-dispersible polymer particles in the invention in the ink composition is preferably from 1 to 30% by mass, and more preferably from 5 to 15% by mass, based on the mass of the ink composition from the standpoints of gloss of an image, and the like.

The content ratio between the color material and the self-dispersible polymer particles (color material/self-dispersible polymer particles) in the water-based ink composition of the invention is preferably from 1/0.5 to 1/10, and more preferably from 1/1 to 1/4, from the standpoints of scratch fastness of an image, and the like.

Hydrophilic Organic Solvent

The ink composition of the invention contains water as a solvent, and may further contain a hydrophilic organic solvent. The hydrophilic organic solvent may be contained as a drying inhibitor or a permeation accelerator.

Where the ink composition of the invention is particularly applied to an image recording method by an inkjet method, the drying inhibitor can effectively prevent clogging of nozzle that may possibly be generated by drying of an ink at an ink jet orifice.

The drying inhibitor is preferably a hydrophilic organic solvent having vapor pressure lower than that of water. Specific examples of the drying inhibitor include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol, such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulforene; polyfunctional compounds such as diacetone alcohol and diethanolamine; and urea derivatives. Above all, polyhydric alcohols such as glycerin and diethylene glycol are preferred as the drying inhibitor. Those drying inhibitors may be used alone or as mixtures of two kinds or more thereof. Those drying inhibitors are preferably contained in an amount of from 10 to 50% by mass in the ink.

The permeation accelerator is preferably used for the purpose of well permeating the ink into a recording medium (printing paper). Specific examples of the permeation accelerator include alcohols such as ethanol, isopropanol, butanol, di(tri)ethylene glycol monobutyl ether and 1,2-hexanediol; sodium lauryl sulfate, sodium oleate and nonionic surfactants. When the permeation accelerator is contained in the ink composition in an amount of from 5 to 30% by mass, sufficient effect is exhibited. The permeation accelerator is preferably used within a range of the addition amount such that bleeding of printing and print-through are not generated.

The hydrophilic organic solvent can be used to adjust viscosity, other than the above. Specific examples of the hydrophilic organic solvent that can be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formaldehyde, N,N-dimethylformamide, N,N-dimethylacetamide, diemthylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The hydrophilic organic solvent may be used alone or as mixtures of two kinds or more thereof.

Other Additives

The ink composition used in the invention may further contain other additives as necessary. Examples of other additives used in the invention include conventional additives such as color fading inhibitor, emulsion stabilizer, permeation accelerator, ultraviolet absorber, preservative, antifungal agent, pH adjusting agent, surface tension adjusting agent, defoaming agent, viscosity adjusting agent, dispersant, dispersion stabilizer, anti-rust agent and chelating agent. Those various additives may directly be added after preparation of the ink composition, or may be added at the time of preparation of the ink composition.

The ultraviolet absorber is used for the purpose of improving preservability of an image. The ultraviolet absorber can use benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, JP-B Nos. 48-30492 and 56-21141, and JP-A No. 10-88106; triazine compounds described in, for example, JP-A Nos. 4-298503, 8-53427, 8-239368 and 10-182621, and JP-A No. 8-501291; compounds described in Research Disclosure No. 24239; and compounds that absorb ultraviolet light and emit fluorescence, i.e., fluorescent brighteners, representative examples thereof including stilbene compounds and benzoxazole compounds.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the antifungal agent include sodium dehydroacetate, sodium benzoate, sodium pyridinethion-1-oxide, p-hydroxybenzoic acid ethyl ester, 1,2-benzisothiazolin-3-one and its salt. Those are preferably used in the water-based ink composition in an amount of from 0.02 to 1.00% by mass.

As the pH adjusting agent, a neutralizer (organic base and inorganic alkali) may be used. The pH adjusting agent may be added in an amount such that the water-based ink composition has a pH of preferably from 6 to 10, and more preferably from 7 to 10, for the purpose of improving storage stability of the water-based ink composition.

Examples of the surface tension adjusting agent include nonionic surfactants, cationic surfactants, anionic surfactants and betaine surfactants.

The surface tension adjusting agent is added in an amount such that the surface tension of the ink composition is adjusted to preferably from 20 to 60 mN/m, more preferably from 20 to 45 mN/m, and further preferably from 25 to 40 mN/m, in order to well eject the ink composition by an inkjet method. On the other hand, when an ink is applied by a method other than an inkjet method, the surface tension is preferably in a range of from 20 to 60 mN/m, and more preferably in a range of from 30 to 50 mN/m.

The surface tension of the ink composition can be measured using, for example, a plate method.

Specific examples of the surfactant as a hydrocarbon type preferably include anionic surfactants such as fatty acid salts, alkyl sulfate ester salts, alkyl benzene sulfonates, alkyl naphthalene sulfonate salts, dialkyl sulfosuccinate salts, alkyl phosphate ester salts, naphthalenesulfonic acid-formalin condensates and polyoxyethylene alkyl sulfate ester salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) which are an acetylene type polyoxyethylene oxide surfactant are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorine (alkyl fluoride type) surfactants, silicone surfactants and the like, such as those described in JP-A Nos. 2003-322926, 2004-325707 and 2004-309806 are used, scratch fastness can be improved.

The surface tension adjusting agent can also be used as a defoaming agent, and fluorine compounds, silicone compounds, chelating agents represented by EDTA, and the like can be used.

When the ink is applied by an inkjet method, the ink composition of the invention may have a viscosity preferably in a range of from 1 to 30 mPa·s, more preferably in a range of from 1 to 20 mPa·s, further preferably in a range of from 2 to 15 mPa·s, and particularly preferably in a range of from 2 to 10 mPa·s, from the standpoints of droplet ejection stability and aggregation speed.

When the ink is applied by a method other than an inkjet method, the viscosity may be preferably in a range of from 1 to 40 mPa·s, and more preferably in a range of from 5 to 20 mPa·s.

The viscosity of the ink composition can be measured using, for example, a Brookfield viscometer.

[Reaction Liquid]

An ink set for inkjet recording of the invention contains at least one kind of reaction liquid capable of forming aggregates upon the contact with the ink composition. When the reaction liquid and the ink composition are brought into contact, it is possible to form the ink aggregates at a high speed.

The pH of the reaction liquid in the invention (hereinafter, in some cases, referred to as "processing liquid") is preferably from 1 to 6, more preferably from 2 to 5 and still more preferably from 3 to 5 from the viewpoint of the aggregation speed of the ink composition. The processing liquid in the invention may contain at least one kind of acidic compounds. Examples of the acidic compounds that may be used include compounds having a phosphoric acid group, a phosphonic acid group, a phosphinic group, a sulfuric acid group, a sulfonic acid group, a sulfinic acid group or a carboxyl group or salts thereof. Among these, compounds having a phosphoric acid group or a carboxyl group are preferred and compounds having a carboxyl group are more preferred from the viewpoint of the aggregation speed of the aqueous ink composition.

Preferable examples of a compound having a carboxyl group in the invention include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, the derivatives thereof and salts thereof. The compounds may be used singularly or in a combination of two or more kinds thereof.

The processing liquid in the invention may further include an aqueous solvent (such as water) in addition to the acidic compound.

A content of the acidic compound of the processing liquid is, relative to a total weight of the processing liquid, preferably from 5 to 95% by mass and more preferably from 10 to 80% by mass from the viewpoint of the aggregation effect.

Preferable examples of the reaction liquid that improves fast aggregating property and may be used in the invention include a reaction liquid in which a polyvalent metallic salt or polyallyl amine is added. Examples of components of a liquid composition include alkaline earth metals of a 2A group of a periodic table (such as magnesium and calcium); transition metals of 3B group of the periodic table (such as lanthanum); cations from 3A group of the periodic table (such as aluminum); and lanthanides (such as neodymium) as examples of polyvalent metallic salt; polyallylamine and polyallyamine derivatives. Preferable examples include calcium and magnesium. Preferable examples of anions which may be adopted as a counter salt of calcium or magnesium include carboxylate salts (such as a formate salt, an acetate salt or a benzoate salt), nitrate, chloride and thiocyanate. An addition amount of the salt to the processing liquid may be substantially from 1 to 10% by mass, preferably substantially from 1.5 to 7% by mass and more preferably substantially from 2 to 6% by mass.

The processing liquid may contain other additives within a range that does not disturb the advantage of the invention. Examples of the other additives include known additives such as a drying inhibitor (wetting agent), an color fading inhibitor, a emulsion stabilizer, a permeation accelerator, a UV absorbent, a preservative, an antifungal agent, a pH adjusting agent, a surface tension adjusting agent, a defoaming agent, a viscosity adjusting agent, a dispersant, a dispersion stabilizer, a rust inhibitor or a chelating agent. Those shown in specific examples of the other additives contained in the aqueous ink composition may be applied.

The viscosity of the processing liquid in the invention is preferably from 1 to 30 mPa·s, more preferably from 1 to 20 mPa·s, still more preferably from 2 to 15 mPa·s and particularly preferably from 2 to 10 mPa·s from the viewpoint of the aggregation speed of the ink composition.

Furthermore, the surface tension of the processing liquid is preferably from 20 to 60 mN/m, more preferably 20 to 45 mN/m and still more preferably 25 to 40 mN/m from the viewpoint of the aggregation speed of the ink composition.

<Image Recording Method>

An image recording method of the invention is a method in which the ink set for inkjet recording is used. The use of the ink composition and the reaction liquid may enable to record an image at a higher speed.

The image recording method of the invention preferably includes applying the reaction liquid to a recording medium (a reaction liquid application step); and bringing the reaction liquid and ink composition into contact to form an aggregate (an ink application step). Thereby, it is possible to realize aggregate formation at a higher speed and excellent ink fixability.

[Reaction Liquid Application Step]

As a method of applying a reaction liquid on a recording medium, a known liquid applying method is used without particular restriction. For instance, an inkjet method or a coating roller method is used for applying the reaction liquid.

A method of applying a reaction liquid in the invention may be a method in which the reaction liquid is applied imagewise or a method in which the reaction liquid is applied to a recording medium in plane.

An application amount of the reaction liquid may be appropriately selected in accordance with an applying method without particular restriction as far as the ink composition is aggregated. When the reaction liquid contains an oxide compound for instance, an oxide compound may well be 0.3 g/m² or more, preferably from 0.3 to 2 g/m² and more preferably from 0.5 to 1 g/m². When the coating amount is set in the range by means of an inkjet method or a coating roller method, a concentration of the reaction liquid and a coating amount of the reaction liquid may be appropriately selected.

[Aggregate Formation Step]

An aggregate formation step in the invention is not particularly restricted as far as it is a method according to an ink-jet method, and is capable of applying an ink composition so as to bring the reaction liquid applied to a recording medium and the ink composition into contact to enable to form an aggregate.

An inkjet recording method includes all recording methods in which an ink composition is ejected as liquid droplets from a narrow nozzle and the liquid droplets are bonded to a recording medium. Specific examples of inkjet recording methods that may use the ink composition of the invention will be described below.

A first method is a method called as an electrostatic suction method. The electrostatic suction method is a method in which a strong electric field is applied between a nozzle and an acceleration electrode located in front of the nozzle, a liquid droplet like ink is continuously sprayed from the nozzle, a printing information signal is applied to deflecting electrodes while the ink droplets go past between the deflecting electrodes so as to fly the ink droplets toward the recording medium and the ink is fixed on the recording medium to record an image, or a method in which the ink droplets are sprayed from a nozzle toward on the recording medium according to a print information signal without deflecting the ink droplets to fix and record an image on a recording medium. The ink set of the present invention is preferably used in this recording method according to the electrostatic suction method.

A second method is a method of forcibly jetting ink droplets from a nozzle by mechanically vibrating an inkjet nozzle using a quartz oscillator while applying pressure to the ink liquid with a small pump. The ink droplets jetted from the nozzle are electrically charged at the same time with jetting, a printing information signal is provided to deflecting electrodes while the ink droplets go past between the deflecting electrodes so as to fly the ink droplets to the recording medium, and thereby an image is recorded on the recording medium. The ink set of the present invention is preferably used in this recording method.

A third method is a method (piezo) in which pressure and a printing information signal are simultaneously applied to an ink liquid with a piezoelectric element so as to jet out the ink droplets from the nozzle towards the recording medium and thereby an image is formed on the recording medium. The ink set of the present invention is preferably used with this recording method.

A fourth method is a method (BUBBLE JET (registered trade mark)) where an ink liquid is heated to bubble using ultrafine electrodes in accordance with printing signal information, then the ink liquid is jetted out from the nozzle toward the recording medium by the expansion of the bubbles and thereby an image is recorded on the recording medium. The ink set of the present invention is preferably used with this recording method.

There is no restriction to the recording medium in the invention. Examples of the recording medium in the invention include regular paper, woodfree paper, and coated paper.

Recorded matter obtained by recording with the ink set of the present invention has excellent image quality and excellent fixability.

EXAMPLES

In what follows, the invention will be described with reference to examples. However, the invention is not restricted to these examples. Unless otherwise indicated, "part(s)" and "%" are based on weight ("part(s) by mass" and "% by mass" respectively).

Example 1

Preparation of Ink Composition
[Preparation of Pigment (Color Material) Dispersion Liquid]
(Preparation of Polymer Dispersant PD-1)

A mixed solution of 6 parts of styrene, 11 parts of stearyl methacrylate, 4 parts of STYRENE MACROMER AS-6 (trade name, manufactured by Toagosei Co., Ltd.), 5 parts of BLEMMER PP-500 (trade name, manufactured by Nippon Oil & Fats Co., Ltd.), 5 parts of methacrylic acid, 0.05 parts of 2-mercaptoethanol and 24 parts of methyl ethyl ketone was prepared in a reaction vessel.

On the other hand, 14 parts of styrene, 24 parts of stearyl methacrylate, 9 parts of STYRENE MACROMER AS-6 (trade name, manufactured by Toagosei Co., Ltd.), 9 parts of BLEMMER PP-500 (trade name, manufactured by Nippon Oil & Fats Co., Ltd.), 10 parts of methacrylic acid, 0.13 parts of 2-mercaptoethanol, 56 parts of methyl ethyl ketone and 1.2 parts of 2,2'-azobis(2,4-dimethylvaleronitrile) were charged in a dropping funnel and thereby a mixed solution thereof was prepared.

Then, the mixed solution in the reaction vessel was heated to 75° C. under a nitrogen atmosphere while agitating and the mixed solution in the dropping funnel was gradually dropped over 1 hour. Two hours after the completion of the dropping, a solution obtained by dissolving 1.2 parts of 2,2'-azobis(2,4-dimethylvaleronitrile) in 12 parts of methyl ethyl ketone was dropped over 3 hours, followed by further aging for 2 hours at 75° C. and for 2 hours at 80° C., thereby a polymer dispersant (PD-1) solution was obtained.

A part of the resulting polymer dispersant solution was separated and a solvent was removed from the separated polymer dispersant solution to isolate solid content. The isolated solid content was diluted to 0.1% with tetrahydrofuran, followed by measuring a weight average molecular weight by use of a high-performance GPC (gel permeation chromatography) HLC-8220GPC with three of TSKgel Super HZM-H, TSKgeL Super HZ4000 and TSKgeL Super HZ2000 (these are trade names; manufactured by Tosoh Corporation) connected in series. As the result, a weight average molecular weight of the isolated solid content was 25,000 in terms of polystyrene. The acid value thereof was 100 mgKOH/g as a calculated value.

(Preparation of Cyan Dispersion Liquid)

In the next place, 5.0 g in terms of solid content of the resulted polymer dispersant solution, 10.0 g of a cyan pigment Pigment Blue 15:3 (manufactured by Dainichiseika Color and Chemicals Mfg. Co., Ltd.), 40.0 g of methyl ethyl ketone, 8.0 g of 1 mol/L sodium hydroxide, 82.0 g of ion exchange water and 300 g of 0.1 mm zirconia beads were fed in a vessel, followed by dispersing at 1000 rpm for 6 hours by use of a ready mill disperser (manufactured by Aimex Co., Ltd.). A resulted pigment dispersion liquid was subjected to the reduced pressure condensation with an evaporator until methyl ethyl ketone was sufficiently distilled away, thereby a pigment concentration of substantially 12% was obtained.

Thereafter, the pigment dispersion liquid was subjected to a centrifugal operation at 8000 rpm for 30 minutes and coarse particles remained as precipitates were removed. The absorbance of a supernatant fluid was measured to determine a pigment concentration.

As mentioned above, a cyan dispersion liquid C1 as a color material was prepared. An average particle size of the resulted cyan dispersion liquid C1 was 81 nm.

(Preparation of Magenta Dispersion Liquid)

A magenta dispersion liquid M1 was prepared in a similar manner to the preparation of cyan dispersion liquid, except that in the preparation of the cyan dispersion liquid, in place of the cyan pigment Pigment Blue 15:3, a magenta pigment Pigment Red 122 was used. An average particle size of the resulted magenta dispersion liquid M1 was 69 nm.

(Preparation of Yellow Dispersion Liquid)

A yellow dispersion liquid Y1 was prepared in a similar manner to the preparation of cyan dispersion liquid, except that in the preparation of the cyan dispersion liquid, in place of the cyan pigment Pigment Blue 15:3, the yellow pigment Pigment Yellow 74 was used and an addition amount of the polymer dispersant was changed to 4.0 g in terms of solid content. An average particle size of the resulted yellow dispersion liquid Y1 was 82 nm.

(Preparation of Black Dispersion Liquid)

A black dispersion liquid K1 was prepared in a similar manner to the preparation of cyan dispersion liquid, except that in the preparation of the cyan dispersion liquid, in place of the cyan pigment Pigment Blue 15:3, carbon black (trade name: NIPEX160-IQ, manufactured by Degussa) was used and an addition amount of the polymer dispersant was changed to 3.0 g in terms of solid content. An average particle size of the resulted black dispersion liquid K1 was 130 nm.

[Preparation of Self-Dispersing Polymer Particles]

Synthesis Example 1

In a 2 L three-neck flask provided with an agitator, a thermometer, a reflex cooling tube and a nitrogen gas introducing tube, 360.0 g of methyl ethyl ketone was charged, followed by heating up to 75° C. With a temperature inside of a reaction vessel keeping at 75° C., a mixed solution containing 180.0 g of phenoxyethyl acrylate, 162.0 g of methyl methacrylate, 18.0 g of acrylic acid, 72 g of methyl ethyl ketone and 1.44 g of "V-601" (trade name, manufactured by Wako Pure Chemical Industries, Ltd.) was dropped at a constant speed so that the dropping may come to completion in 2 hours. After the completion of the dropping, a solution containing 0.72 g "V-601" and 36.0 g of methyl ethyl ketone was added thereto, followed by agitating at 75° C. for 2 hours, further followed by adding a solution containing 0.72 g "V-601" and 36.0 g of isopropanol, still further followed by agitating at 75° C. for 2 hours, followed by heating to 85° C., further followed by agitating for 2 hours. A weight average molecular weight (Mw) of a resulted copolymer was 64,000 (calculated in terms of polystyrene due to gel permeation chromatography (GPC) with columns of TSKgel Super HZM-H, TSKgel Super HZ4000 and TSKgel Super HZ2000 (trade names, manufactured by Tosoh Corporation)) and the acid value thereof was 38.9 (mgKOH/g).

In the next place, 668.3 g of a polymerization solution was weighed, 388.3 g of isopropanol and 145.7 ml of 1 mol/L NaOH aqueous solution were added thereto and a temperature inside of the reaction vessel was raised to 80° C. Then, 720.1 g of distilled water was dropped at a speed of 20 ml/minute to disperse in water. Thereafter, under atmospheric pressure, a temperature inside of the reaction vessel was kept at 80° C. for 2 hours, at 85° C. for 2 hours and at 90° C. for 2 hours, after that the inside of the reaction vessel was depresurized to distill away 913.7 g in total of isopropanol, methyl ethyl ketone and distilled water, thereby an aqueous dispersion (emulsion) of self-dispersing polymer particles (B-01) having a solid content of 28.0% was obtained. Numbers of the respective constituent units of a compound example (B-01) shown below are mass ratios. In what follows, the situation is same with the respective structural formulas.

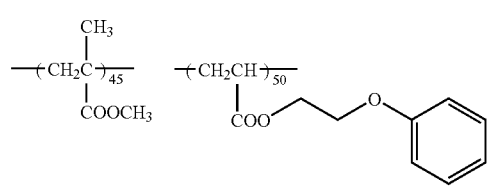

(B-01)

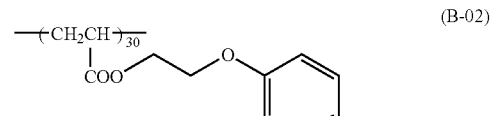

Synthesis Example 2

Dispersion liquids of self-dispersing polymer particles (B-02) through (B-05) and (B-15) through (B-19) shown below were obtained in a manner similar to the synthesis example 1, except that, in the synthesis of a compound example (B-01) of the synthesis example 1, in place of 180.0 g of phenoxyethyl acrylate, 162.0 g of methyl methacrylate and 18.0 g of acrylic acid, the kind and a mixing ratio of the monomers used were changed so that the respective constituent units of compound examples below have mass ratios shown below.

The physical properties of the resulted (B-02) through (B-05) and (B-15) through (B-19) are shown in Table 1. In all cases, the degree of neutralization of the self-dispersing polymer was adjusted to 0.75 mol equivalent relative to 1 mol of the dissociative groups by adjusting an amount of an aqueous solution of 1 mol/L NaOH.

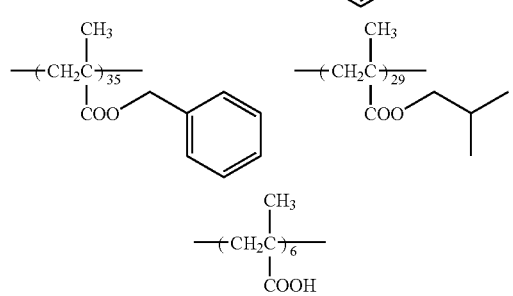

(B-02)

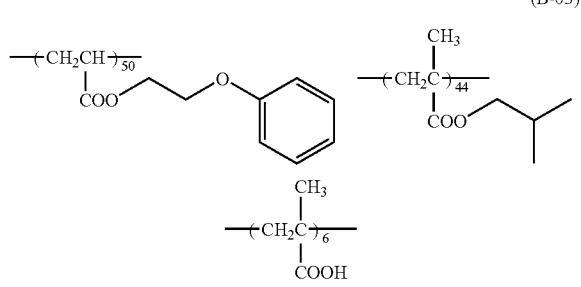

(B-03)

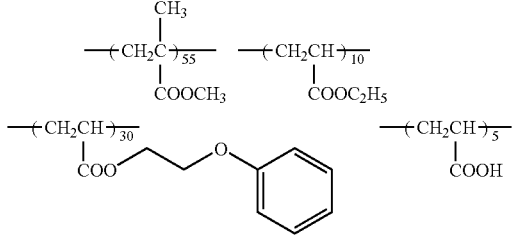

(B-04)

-continued

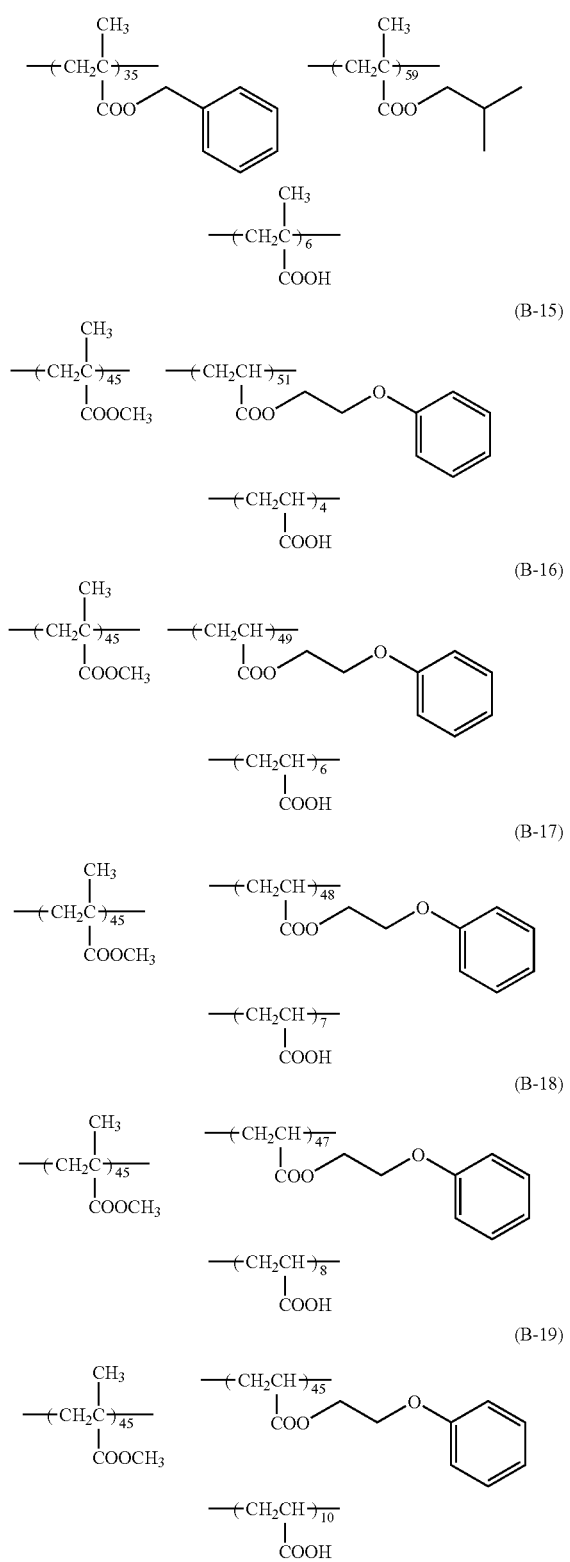

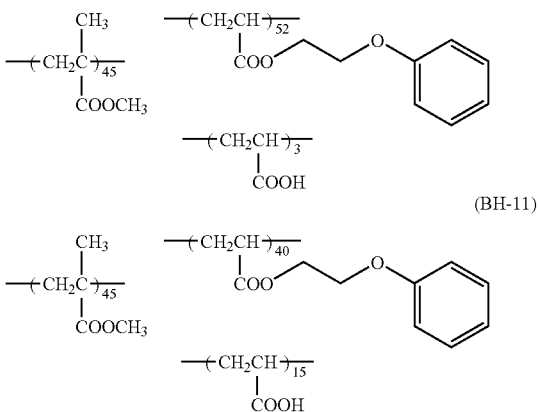

TABLE 1

| | Weight Average Molecular Weight | Acid Value (mgKOH/g) | Particle Size (nm) |
|---|---|---|---|
| B-01 | 64,000 | 39 | 30 |
| B-02 | 58,000 | 39 | 32 |
| B-03 | 65,000 | 39 | 40 |
| B-04 | 52,000 | 39 | 35 |
| B-05 | 44,000 | 39 | 45 |
| B-15 | 65,000 | 31 | 30 |
| B-16 | 69,000 | 47 | 23 |
| B-17 | 68,000 | 55 | 21 |
| B-18 | 72,000 | 62 | 15 |
| B-19 | 69,000 | 78 | 10 |
| BH-1 | 232,000 | 23 | 70 |

[Preparation of Ink Composition]

With above-obtained color material dispersion liquids (dispersion liquids C1, M1, Y1 and K1) and the self-dispersing polymer particles (B-01), the respective components were mixed so as to be ink compositions shown below and thereby crude ink compositions were prepared. Each of the prepared crude ink composition was charged in a plastic disposable syringe and filtered with a PVDF 5μ filter (trade name: MILLEX-SV, manufactured by Millipore Corporation, diameter: 25 mm), thereby each ink composition was completed.

| (Composition of Ink C-1) | |
|---|---|
| Cyan pigment (Pigment Blue 15:3) | 4% |
| Polymer dispersant PD-1 | 2% |
| Self-dispersing polymer fine particles B-01 | 8% |
| SUNNIX GP250 (trade name, manufactured by Sanyo Kasei K.K., hydrophilic organic solvent) | 10% |
| Diethylene glycol monoethyl ether (manufactured by Wako Pure Chemical Industries, Ltd., hydrophilic organic solvent) | 5% |
| OLFINE E1010 (trade name, manufactured by Nissin Chemical Industries Co., Ltd., surfactant) | 1% |
| Ion exchange water | 70% |

| (Composition of Ink C-2) | |
|---|---|
| Cyan pigment (Pigment Blue 15:3) | 4% |
| Polymer dispersant PD-1 | 2% |
| Self-dispersing polymer fine particles B-01 | 8% |

When particles of polymer having a structural formula below in which an amount of acrylic amount was changed to 3% (acid value: 23) or 15% (acid value: 117) were prepared, the polymer particles were not self-dispersed.

(Composition of Ink C-2)

| | |
|---|---:|
| Diethylene glycol (manufactured by Wako Pure Chemical Industries, Ltd., hydrophilic organic solvent) | 10% |
| Glycerin (manufactured by Wako Pure Chemical Industries, Ltd., hydrophilic organic solvent) | 20% |
| OLFINE E1010 (trade name, manufactured by Nissin Chemical Industries Co., Ltd., surfactant) | 1% |
| Ion exchange water | 70% |

(Composition of Ink M-1)

| | |
|---|---:|
| Magenta pigment (Pigment Red 122) | 4% |
| Polymer dispersant PD-1 | 2% |
| Self-dispersing polymer fine particles B-01 | 8% |
| Glycerin (manufactured by Wako Pure Chemical Industries, Ltd., hydrophilic organic solvent) | 20% |
| Diethylene glycol (manufactured by Wako Pure Chemical Industries, Ltd., hydrophilic organic solvent) | 10% |
| OLFINE E1010 (trade name, manufactured by Nissin Chemical Industries Co., Ltd., surfactant) | 1% |
| Ion exchange water | 55% |

(Composition of Ink Y-1)

| | |
|---|---:|
| Yellow pigment (Pigment Yellow 74) | 4% |
| Polymer dispersant PD-1 | 1.6% |
| Self-dispersing polymer fine particles B-01 | 8% |
| SUNNIX GP250 (trade name, manufactured by Sanyo Kasei K.K., hydrophilic organic solvent) | 10% |
| Diethylene glycol monoethyl ether (manufactured by Wako Pure Chemical Industries, Ltd., hydrophilic organic solvent) | 5% |
| OLFINE E1010 (trade name, manufactured by Nissin Chemical Industries Co., Ltd., surfactant) | 1% |
| Ion exchange water | 54.6% |

(Composition of Ink K-1)

| | |
|---|---:|
| Carbon black | 4% |
| Polymer dispersant PD-1 | 1.2% |
| Self-dispersing polymer fine particles B-01 | 8% |
| SUNNIX GP250 (trade name, manufactured by Sanyo Kasei K.K., hydrophilic organic solvent) | 10% |
| Diethylene glycol monoethyl ether (manufactured by Wako Pure Chemical Industries, Ltd., hydrophilic organic solvent) | 5% |
| OLFINE E1010 (trade name, manufactured by Nissin Chemical Industries Co., Ltd., surfactant) | 1% |
| Ion exchange water | 54.2% |

(Inks M-2 through M-6 and M-11 through M-15)

Inks M-2 through M-6 and M-11 through M-15 were prepared in a manner similar to that of ink M-1 except that in the composition of ink M-1, in place of the self-dispersing polymer particles B-01, self-dispersing polymer particles B-02 through 05 and B-11 through 15 were respectively used.

Physical properties of the above-obtained respective inks are shown in Table 2 below. In Table 2, the respective physical properties were measured respectively as shown below.

The surface tension was measured at 25° C. by use of CBVP-Z (trade name, manufactured by Kyowa Interface Science Co.,) according to a Wilhelmy method with a platinum plate.

The viscosity was measured of 0.5 mL of undiluted liquid of the ink composition at 25° C. with a cone plate (1° 34, φ35 mm) by use of DV-II+VISCOMETER (trade name, manufactured by BROOKFIELD Co., Ltd.) and an average value of data in the range of 20 to 95% in the torque and in the range of 10 to 100 rpm in the number of rotations was taken as a measurement value.

A number of coarse particles was measured by use of FPIA3000 (trade name, manufactured by SYSMEX Co., Ltd.) of a sample obtained by diluting the undiluted liquid of the ink composition to 5 times, by measuring a number of particles having a particle size of 5 µm or more in a high magnification unit LPF mode. The measurement value (number of particles/µL) was multiplied by 5 to obtain a number of coarse particles.

The pH was measured of an undiluted liquid of the ink composition at 25° C. with a pH meter WM-50EG (trade name, manufactured by Toa DKK).

A particle size was measured of a liquid obtained by diluting the ink composition to 50 to 1000 times with ion exchange water as a volume average particle diameter Mv measured with NANOTRUCK PARTICLE SIZE DISTRIBUTION ANALYZER UPA-EX150 (trade name, manufactured by Nikkiso Co., Ltd.) under conditions of 25° C., particle permeability: permeation, particle shape: nonspherical, and particle density: 1.2.

Furthermore, a particle size over time was measured in a manner similar to the above particle size measurement, after the ink composition was left in a closed state for 15 days at 58° C.

TABLE 2

|  | Viscosity [mPa·s] | Surface Tension [mN/m] | pH | Particle Diameter [nm] | Number of Coarse Particles [pieces/μL] | Temporal Particle Diameter [nm] | Remarks |
|---|---|---|---|---|---|---|---|
| Ink C-1 | 4.7 | 35.6 | 8.6 | 83.2 | 0 | 84.1 | Present invention |
| Ink C-2 | 6.8 | 36.0 | 8.6 | 81.8 | 0 | 80.9 | Present invention |
| Ink M-1 | 4.6 | 35.6 | 8.5 | 69.1 | 25 | 70.3 | Present invention |
| Ink M-2 | 4.5 | 35.6 | 8.5 | 66.8 | 0 | 67.3 | Present invention |
| Ink M-3 | 4.8 | 35.6 | 8.6 | 68.4 | 10 | 69.4 | Present invention |
| Ink M-4 | 4.7 | 35.6 | 8.6 | 68.5 | 0 | 68.8 | Present invention |
| Ink M-5 | 4.8 | 35.6 | 8.6 | 68.8 | 0 | 69.0 | Present invention |
| Ink M-15 | 4.5 | 35.6 | 8.6 | 67.2 | 0 | 68.5 | Present invention |
| Ink M-16 | 4.6 | 35.6 | 8.6 | 68.4 | 0 | 68.2 | Present invention |
| Ink M-17 | 4.7 | 35.4 | 8.6 | 68.0 | 0 | 68.0 | Present invention |
| Ink M-18 | 4.8 | 35.6 | 8.6 | 71.2 | 5 | 70.0 | Present invention |
| Ink M-19 | 4.9 | 35.6 | 8.6 | 67.2 | 5 | 68.0 | Present invention |
| Ink Y-1 | 4.7 | 35.8 | 8.6 | 82.1 | 0 | 84.7 | Present invention |
| Ink K-1 | 4.8 | 34.2 | 8.6 | 159.3 | 0 | 130.0 | Present invention |

Preparation of Reaction Liquid

A reaction liquid was prepared by mixing the respective components so as to be the composition shown below.

| (Composition of Reaction Liquid) | |
|---|---|
| Citric acid (manufactured by Wako Pure Chemical Industries Ltd.,) | 16.7% |
| Diethylene glycol monomethyl ether (manufactured by Wako Pure Chemical Industries Ltd.,) | 20.0% |
| ZONYL FSN-100 (trade name, manufactured by DuPont) | 1.0% |
| Ion exchange water | 62.3% |

The physical properties of the reaction liquid were measured and found that the viscosity was 4.9 mPa·s, the surface tension was 24.3 mN/m and the pH was 1.5.

Comparative Example 1

[Preparation of Fine Particles of Polymer According to Emulsion Polymerization]

Into a 1 L three-neck flask provided with an agitator and a reflex cooling tube, 8.1 g of PIONINE A-43s (trade name, manufactured by Takemoto Yushi Co., Ltd., emulsifying agent) and 236.0 g of distilled water were charged, followed by heating to 70° C. and agitating under nitrogen gas flow. Therein, 6.2 g of styrene, 3.5 g of n-butyl acrylate, 0.3 g of acrylic acid, 1.0 g of ammonium persulfate and 40 g of distilled water were added, followed by agitating for 30 minutes, further followed by dropping a monomer solution containing 117.8 g of styrene, 66.5 g of n-butyl acrylate and 5.7 g of acrylic acid at a constant speed so as to complete the dropping during two hours. After the dropping came to completion, an aqueous solution containing 0.5 g of ammonium persulfate and 20 g of distilled water was added, followed by agitating at 70° C. for 4 hours, further followed by heating to 85° C. and continuing agitating for 2 hours. The reaction liquid was cooled and filtered, and thereby a dispersion liquid of particles of polymer represented by a compound example (BH-1) below was obtained. The physical properties of obtained fine particles of polymer are shown in Table 1.

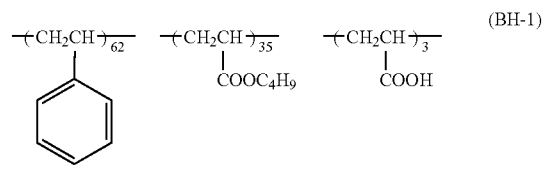

(BH-1)

Preparation of Ink Composition

Ink compositions CH-1 through CH-3 having the compositions shown below were prepared in a manner similar to the preparation of the ink compositions in Example 1.

| (Composition of Ink CH-1) | |
|---|---|
| Cyan pigment (Pigment Blue 15:3) | 4% |
| Polymer dispersant PD-1 | 2% |
| MICROJEL E-5002 (trade name, manufactured by Nippon Paint Co., Ltd., styrene-acryl-based emulsion polymerization latex) | 8% |
| SUNNIX GP250 (trade name, manufactured by Sanyo Kasei K.K., hydrophilic organic solvent) | 10% |
| Diethylene glycol monoethyl ether (manufactured by Wako Pure Chemical Industries, Ltd., hydrophilic organic solvent) | 5% |
| OLFINE E1010 (trade name, manufactured by Nisshin Kagaku K.K., surfactant) | 1% |
| Ion exchange water | 70% |

| (Composition of Ink CH-2) | |
|---|---|
| Cyan pigment (Pigment Blue 15:3) | 4% |
| Polymer dispersant PD-1 | 2% |
| Emulsion polymerization polymer BH-1 | 8% |
| SUNNIX GP250 (trade name, manufactured by Sanyo Kasei K.K., hydrophilic organic solvent) | 10% |
| Diethylene glycol monoethyl ether (manufactured by Wako Pure Chemical Industries, Ltd., hydrophilic organic solvent) | 5% |
| OLFINE E1010 (trade name, manufactured by Nisshin Kagaku K.K., surfactant) | 1% |
| Ion exchange water | 70% |

| (Composition of Ink CH-3) | |
|---|---|
| Cyan pigment (Pigment Blue 15:3) | 4% |
| Polymer dispersant PD-1 | 2% |
| Glycerin (manufactured by Wako Pure Chemical Industries, Ltd., hydrophilic organic solvent) | 20% |
| Diethylene glycol (manufactured by Wako Pure Chemical Industries, Ltd., hydrophilic organic solvent) | 10% |
| OLFINE E1010 (trade name, manufactured by Nisshin Kagaku K.K., surfactant) | 1% |
| Ion exchange water | 55% |

<Evaluation of Ink Set for Inkjet Recording>

The above-obtained ink compositions and reaction liquids were evaluated as follows.

[Aggregation Speed]

The reaction liquid (processing liquid) was coated by use of a wire bar coater on the photographically finished ink jet paper GASAI VALUE (trade name, manufactured by Fuji Photo Film Co., Ltd.) so that a thickness may be about 5 μm (0.84 g/m$^2$ as a coating amount of citric acid), followed by drying with dry air heated at 80° C. for 15 sec. Immediate thereafter, ink of the first droplet was ejected at a droplet amount of 3.5 pL so as to form a dot, by use of an inkjet printer obtained by modifying GELJET GX5000 (trade name, manufactured by Ricoh Co., Ltd.). At a definite time after the first droplet ejection, an ink of the second droplet was ejected so as to cover the dot by about half. Droplet ejection intervals between the first and second droplets were set at 4, 8, 12, 20, 40 and 90 ms.

An image formed by ejecting ink droplets with the modified printer was observed with a color 3D laser microscope VK-9500 (trade name, manufactured by KEYENCE Corporation) and the aggregation speed was evaluated by whether a dot shape of the ink of the second droplet ejected after a definite time period was confirmed or not. The minimum droplet ejection interval in which the dot shape of the ink of the second droplet was confirmed was taken as the aggregation speed.

Furthermore, the aggregation speed was evaluated based on evaluation criteria shown below. Results are shown in Table 3.

Evaluation Criteria

A: A dot shape obtained by ejection after 4 ms was confirmed.

B: A dot shape obtained by ejection after 8 ms was confirmed.

C: A dot shape obtained by ejection after 12 ms or 20 ms was conformed.

D: A dot shape obtained by ejection after 40 ms or 90 ms was confirmed.

<Tape Peel Resistance>

A head of GELJET GX5000 Printer (trade name, manufactured by Ricoh Co., Ltd.) was disposed obliquely to a scanning direction and fixed. Furthermore, a recording medium was fixed on a work stage and a solid image was formed at the resolution of 1200×600 dpi and a droplet ejection amount of 3.5 pL. At 3 hours after printing, a piece of mending tape (width: 18 mm) (manufactured by Sumitomo-3M Co., Ltd.) was bonded to a printed portion, followed by peeling the tape at a speed of 1 cm/s, further followed by evaluating adhesion of the ink to the tape based on the criteria below. Results are shown in Table 3.

Evaluation Criteria

A: The adhesion of the ink to the tape was not observed.

B: The adhesion of the ink to the tape was observed.

TABLE 3

| | Aggregation Speed (ms) | Evaluation of Aggregation Speed | Tape Peel Resistance | Remarks |
|---|---|---|---|---|
| Ink C-1 | 4 | A | A | Present Invention |
| Ink C-2 | 4 | A | A | Present Invention |
| Ink M-1 | 4 | A | A | Present Invention |
| Ink M-2 | 4 | A | A | Present Invention |
| Ink M-3 | 4 | A | A | Present Invention |
| Ink M-4 | 4 | A | A | Present Invention |
| Ink M-5 | 4 | A | A | Present Invention |
| Ink M-15 | 4 | A | A | Present Invention |
| Ink M-16 | 4 | A | A | Present Invention |
| Ink M-17 | 8 | B | A | Present Invention |
| Ink M-18 | 8 | B | A | Present Invention |
| Ink M-19 | 12 | C | A | Present Invention |
| Ink Y-1 | 4 | A | A | Present Invention |
| Ink K-1 | 4 | A | A | Present Invention |
| Ink CH-1 | 40 | D | A | Comparative Example |
| Ink CH-2 | 90 | D | B | Comparative Example |
| Ink CH-3 | 90 | D | B | Comparative Example |

From Table 3, it is found that when an ink set for inkjet recording of the invention is used, a formation speed of aggregates (aggregation speed) is largely improved. Furthermore, it is found that when an ink set for inkjet recording of the invention is used, the printing excellent in the tape peel resistance may be realized.

According to the present invention, it is possible to provide an ink set for inkjet recording, with which ink aggregation at a high speed may be realized, and an image recording method using the inkset for inkjet recording.

Exemplary embodiments of the present invention will be listed. However, the present invention is not restricted to the following exemplary embodiment.

<1> An ink set for inkjet recording, comprising:

at least one ink composition that contains self-dispersing polymer particles, a color material and water; and a reaction liquid capable of forming an aggregate upon contact with the ink composition.

<2> The ink set for inkjet recording according to <1>, wherein the self-dispersing polymer particles contain a first polymer that has at least one carboxyl group and has an acid value of from 25 to 100.

<3> The ink set for inkjet recording according to <2>, wherein the first polymer is a polymer synthesized in an organic solvent, the at least one carboxyl group in the first polymer is neutralized at least partially, and the self-dispersing polymer particles are prepared as particles dispersed in a polymer dispersion that contains water as a continuous phase.

<4> The ink set for inkjet recording according to any one of <1> to <3>, wherein the self-dispersing polymer particles contain a constituent unit derived from an aromatic group-containing acrylate or methacrylate monomer, the content of the constituent unit derived from the aromatic group-containing acrylate or methacrylate monomer being from 10% by mass to 95% by mass.

<5> The ink set for inkjet recording according to <4>, wherein the aromatic group-containing acrylate or methacrylate monomer is phenoxyethyl acrylate.

<6> The ink set for inkjet recording according to any one of <1> to <5>, wherein the color material is coated with a second polymer having a carboxyl group and is water-insoluble.

<7> The ink set for inkjet recording according to <6>, wherein the acid value of the first polymer is smaller than that of the second polymer.

<8> The ink set for inkjet recording according to any one of <1> to <7>, wherein the reaction liquid contains a compound having a carboxyl group.

<9> An image recording method comprising forming an image using the ink set for inkjet recording of any one of <1> to <8>.

<10> The image recording method according to <9>, comprising:

applying the reaction liquid to a recording medium; and bringing the reaction liquid and the ink composition into contact with each other to form an aggregate.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set for inkjet recording, comprising:

at least one ink composition that contains self-dispersing polymer particles, a color material and water; and a reaction liquid capable of forming an aggregate upon contact with the ink composition, wherein the color material is coated with a second polymer having a carboxyl group and is water-insoluble.

2. The ink set for inkjet recording according to claim 1, wherein the self-dispersing polymer particles contain a first polymer that has at least one carboxyl group and has an acid value of from 25 to 100.

3. The ink set for inkjet recording according to claim 2, wherein the first polymer is a polymer synthesized in an organic solvent, the at least one carboxyl group in the first polymer is neutralized at least partially, and the self-dispersing polymer particles are prepared as particles dispersed in a polymer dispersion that contains water as a continuous phase.

4. The ink set for inkjet recording according to claim 1, wherein the self-dispersing polymer particles contain a constituent unit derived from an aromatic group-containing acrylate or methacrylate monomer, the content of the constituent unit derived from the aromatic group-containing acrylate or methacrylate monomer being from 10% by mass to 95% by mass.

5. The ink set for inkjet recording according to claim 4, wherein the aromatic group-containing acrylate or methacrylate monomer is phenoxyethyl acrylate.

6. The ink set for inkjet recording according to claim 1, wherein the acid value of the first polymer is smaller than that of the second polymer.

7. The ink set for inkjet recording according to claim 1, wherein the reaction liquid contains a compound having a carboxyl group.

8. An image recording method comprising forming an image using the ink set for inkjet recording of claim 1, said image recording method further comprising:

applying the reaction liquid to a recording medium; and bringing the reaction liquid and the ink composition into contact with each other to form an aggregate.

\* \* \* \* \*